March 18, 1958  H. ROLLMAN ET AL  2,826,832
TREAD MEMBER FOR A SHOE
Original Filed Feb. 29, 1952
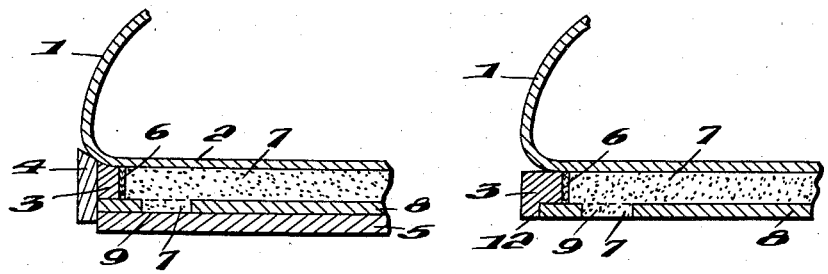
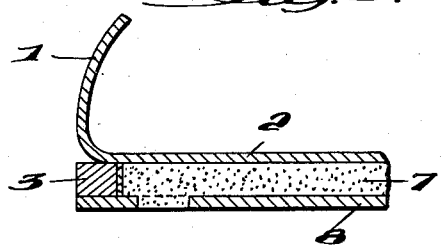
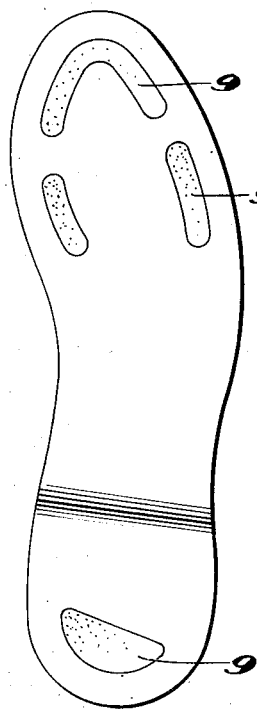
INVENTORS
Heinz Rollman
Andrew Szernyi
and Curt Kaufman
BY
Doss T. Hatfield
ATTORNEY

United States Patent Office 2,826,832
Patented Mar. 18, 1958

2,826,832
TREAD MEMBER FOR A SHOE

Heinz Rollman, Andrew Szerenyi, and Curt Kaufman, Waynesville, N. C., assignors to Ro-Search Inc, Waynesville, N. C.

Original application February 29, 1952, Serial No. 274,094, now abandoned. Divided and this application June 25, 1954, Serial No. 439,434

1 Claim. (Cl. 36—28)

The invention refers to footwear, having soles or heels or both composed partly of solid rubber and partly of a softer filler, mostly of porous rubber. This application is a division of our pending application Serial No. 274,094, which was filed as a continuation-in-part of our application Serial No. 29,354, filed May 26, 1948, both now abandoned. Each of the prior applications describe a method in which unvulcanized rubber mix, to form a solid rubber outer rim, is placed into a mold and material for a soft center part of the sole is placed adjacent to it, but separated therefrom by pressure resisting separators, so that in heating the mold and subjecting it to pressure only the solid rubber mix is subjected to outside molding pressure, while the soft filler, which may be a rubber mix for porous rubber, can form and set undisturbed by outside pressure. The present application is a continuation of our earlier application and refers more particularly to such footwear where a solid rubber is molded and vulcanized simultaneously with the forming and the vulcanization of soft porous inserts.

One object of the invention is to provide a tread member for a shoe comprising an upstanding perimetric rim forming a depressed central portion, said central portion having spaced apertures therethrough and porous rubber filling the tread member within said rim and said apertures.

Other objects of the invention are clarified hereafter in connection with the drawing, which shows In Figure 1 a schematic cross-section of the edge of a shoe bottom placed in a mold before exerting pressure, In Fig. 2 the same shoe bottom after vulcanization and removal from the mold, In Fig. 3 a modified form of a shoe bottom, In Fig. 4 a view of the sole with the heel looking at the tread surface thereof.

As shown in Fig. 1, the shoe bottom may comprise the lower margin of an upper 1 connected to an insole 2 to which a solid rubber rim is molded. A solid rubber mix 3 is placed into the mold consisting of the frame 4 and the bottom plate 5. A separator 6 of pressure-resisting material such as a strip of rather stiff leather is placed into the mold to separate the area of the rim from the area to be filled with porous rubber. Material to form the porous rubber is placed as a layer 7 which only partially fills the area of the shell before it expands under the influence of the heat. A tread sole 8, placed into the mold, is provided with cut-outs 9. Molding pressure is exerted by the bottom plate 5 against the solid rubber mix 3 so that it adheres strongly to the upper 1 and the tread sole 8. Any excess of rubber might escape at 11 between the separator 6 and the insole 2, so that no trimming of any rubber excess on the outside of the shoe bottom will be needed. The porous rubber formed by the mix 7 fills not only the center area of the sole, but also the cut-outs 9, and as the tread surface 8 and the porous rubber mix 7 has been subjected to molding heat and pressure, the porous rubber mix 7 becomes permanently bonded to the shell and to the side walls surrounding the cut-outs.

As shown in Figure 2, the welt of solid rubber 3 might extend to the tread surface and thereby partially enclose the tread sole 8 as shown at 12. As shown in Figure 4, the tread surface has apertures or cut-outs in the front part of the sole, as well as in the heel, and the porous rubber filling extends to the tread surface. Under the pressure of the foot, the porous rubber comes into close contact with the ground and thereby prevents the slipping of the tread sole.

What we claim is:

A sole for footwear comprising a solid rubber shell, said shell including an upstanding rim and a tread surface, said tread surface having a plurality of spaced cut-outs extending entirely therethrough, and porous rubber filling said cut-outs and said shell within said rim, said porous rubber being permanently bonded to said shell and the side walls surrounding the cut-outs.

References Cited in the file of this patent
UNITED STATES PATENTS

| | | |
|---|---|---|
| 1,137,724 | Boyle | Apr. 27, 1915 |
| 1,422,716 | Jones | July 11, 1922 |
| 1,524,997 | Potter | Feb. 3, 1925 |
| 1,677,013 | Bateman | July 10, 1928 |
| 1,679,272 | Schultz | July 31, 1928 |
| 1,749,351 | McQueen | Mar. 4, 1930 |
| 1,766,522 | Letchford | June 24, 1930 |
| 1,867,132 | Berenstein | July 12, 1932 |
| 2,135,570 | Ellis | Nov. 8, 1938 |

FOREIGN PATENTS

| | | |
|---|---|---|
| 367,266 | Italy | Jan. 19, 1939 |
| 463,389 | Italy | Apr. 30, 1951 |